(12) United States Patent
Ursescu et al.

(10) Patent No.: US 10,752,053 B2
(45) Date of Patent: Aug. 25, 2020

(54) FLEXIBLE GALLEY CART CASTER GUIDES

(71) Applicant: The Boeing Company, Chicago, IL (US)

(72) Inventors: Marius Ursescu, Mill Creek, WA (US); Stephen M. Young, Mill Creek, WA (US)

(73) Assignee: The Boeing Company, Chicago, IL (US)

( * ) Notice: Subject to any disclaimer, the term of this patent is extended or adjusted under 35 U.S.C. 154(b) by 232 days.

(21) Appl. No.: 15/653,955

(22) Filed: Jul. 19, 2017

(65) Prior Publication Data

US 2019/0023070 A1 Jan. 24, 2019

(51) Int. Cl.
*B60B 33/00* (2006.01)
*B64D 11/00* (2006.01)

(52) U.S. Cl.
CPC ...... *B60B 33/0026* (2013.01); *B64D 11/0007* (2013.01); *B62B 2202/67* (2013.01)

(58) Field of Classification Search
CPC . B60B 33/0026; B60B 33/02; B60B 33/0047; B60B 33/04; B60B 33/0002; B60B 33/0005; B64D 11/0007; B64D 11/04; B62B 3/002; B62B 2202/67; B62B 2301/0465; B62B 3/1404; B62B 5/0006

USPC .............. 410/66, 67; 244/118.1, 118.5; 248/346.11, 615, 632; 293/25 J; 16/18 CG

See application file for complete search history.

(56) References Cited

U.S. PATENT DOCUMENTS

| | | | | |
|---|---|---|---|---|
| 1,101,883 A | * | 6/1914 | Rochford | B60T 3/00 16/35 R |
| 9,371,085 B2 | | 6/2016 | Young et al. | |
| 2004/0265084 A1 | * | 12/2004 | Hillberry | A61G 5/04 410/66 |
| 2005/0133308 A1 | * | 6/2005 | Reysa | B64D 11/0007 186/40 |
| 2013/0256249 A1 | * | 10/2013 | Burd | B64D 11/04 |
| 2015/0321761 A1 | * | 11/2015 | Young | B62B 3/008 |

\* cited by examiner

*Primary Examiner* — Stephen T Gordon
(74) *Attorney, Agent, or Firm* — Felix L. Fischer

(57) ABSTRACT

A resilient caster guide includes a mounting flange configured to be received against a wall of a galley cart storage compartment. A flexible alignment element angularly extends from the mounting flange into the storage compartment. The flexible alignment element is configured to contact a caster extending from a base of a galley cart received in the storage compartment and to resiliently deform to maintain longitudinal alignment of the caster.

20 Claims, 10 Drawing Sheets

FLEXIBLE GALLEY CART CASTER GUIDES

BACKGROUND INFORMATION

Field

Embodiments of the disclosure relate generally to the galley cart systems for transportation vehicles and more particularly to embodiments for controlling castor swiveling during insertion and extraction from a galley cart storage compartment.

Background

Galley carts are used by most airlines and other transportation companies for distribution of food and drink items to passengers. The carts must be maneuverable to allow transition in narrow aisles and galley areas. Carts with swivel casters (also called swivel castors) are maneuverable, but the casters may swivel unpredictably clockwise or counterclockwise when the direction of the cart is reversed. For use in confined areas, particularly during insertion and removal of carts from the galley cart storage compartment, caster swivel may cause the cart to run into a wall or jam against a wall. For example, in aircraft galley areas, a common issue is the ability of a galley cart caster to swing outward into the galley cart compartment wall, which can cause the wheels to jam and prevent the cart from being easily removed from the galley cart compartment.

Caster jamming typically becomes a problem when reversing the direction of a cart near a wall. One known solution to avoid caster jamming is to avoid placing a cart near a wall. For example, a cart may be stowed in a compartment that is wide enough to allow all casters to swivel freely through 360°. Though an effective solution, space is almost always at a premium, and operating sufficiently away from walls may not be an option. Larger aircraft (i.e., twin aisle aircraft) may have wider cart compartments that can accommodate variations of cart dimensions and rotations/swivel of the caster assemblies. But, smaller aircraft (i.e., single aisle or regional jets) can have narrower cart compartments which may not accommodate the larger clearance dimensioning.

An alternative known solution to avoid caster jamming guides have been installed on the compartment walls near the caster assemblies. A caster guide, a strip of material along a wall, may prevent casters from freely swiveling near the wall. By placing a strip of material along a wall, in close proximity to where a caster may protrude from under a cart, the swivel of the caster can be limited, preventing the casters from swinging into the wall and jamming. While the overall height and width dimensions of galley carts are standardized, the exact dimensions at or near the lower end of the cart are different for different cart manufacturers and different cart models. Some of the dimensions that can differ are as follows: the height between the bottom edge of the side wall and bottom of the wheel, the distance between the caster attachment and the side edge of the side wall, the distance between the caster cover outer surface and the side edge of the side wall, the width of the caster assemblies, the height of the caster assemblies, and/or the size of the caster cover. Due to the wide variability in spacing and geometry of compartments, casters, carts, and associated components, caster guides typically must be custom tailored to each compartment, wall, cart, and caster combination.

In addition, when fitting into a narrow space, the gap between a rigid caster guide and a caster is controlled precisely. If the fit is too tight, it will be difficult to roll the cart into the space and if too loose, and the casters may jam. The rigid guides are usually formed metal or machined plastic. Accordingly, the guides are designed to have at least a limited clearance to the casters (0.060 inches (")-0.125" (0.15 centimeters (cm)-0.32 cm) in order to allow carts to move freely in and out of storage bays. Even so, cart operation can be accompanied by resistance to movement, friction/vibration noise, and occasional binding of the casters. During taxi, take-off, turbulence, and landing, carts are stored and secured in their bays, but the clearance can cause rattling noise and the rigid guides may add weight to the aircraft.

As yet another known alternative solution, carts may include a swivel stop that prevents the caster from swiveling to certain positions (such as protruding from under the cart). Swivel stops reduce the maneuverability of the cart generally and may cause some casters to drag rather than roll even when operated away from a wall.

SUMMARY

Exemplary embodiments provide a resilient caster guide incorporating a mounting flange configured to be received against a side of a galley cart storage compartment. A flexible alignment element angularly extends from the mounting flange into the storage compartment. The flexible alignment element is configured to contact a caster extending from a base of a galley cart received in the storage compartment and to resiliently deform to maintain longitudinal alignment of the caster.

The embodiments allow a method for caster alignment control wherein a galley cart is received in an entry of a storage compartment and a caster on the cart is longitudinally engaged with a flexible alignment element extending in an undeformed shape from a wall of the storage compartment. The flexible alignment element is resiliently flexed for displacement laterally but maintains engagement with the caster. The caster is longitudinally constrained with the flexible alignment element to maintain alignment of the caster for insertion and extraction of the cart from the storage compartment.

BRIEF DESCRIPTION OF THE DRAWINGS

The features, functions, and advantages that have been discussed can be achieved independently in various embodiments of the present invention or may be combined in yet other embodiments further details of which can be seen with reference to the following description and drawings.

DETAILED DESCRIPTION

The embodiments described herein provide an alternative means to prevent caster rotation on galley carts and can accommodate a wide variety of compartment, wall, cart, and caster combinations, without hindering use of the cart.

More specifically, the embodiments described herein provide resilient caster guides that adjust to the dimensions of caster mountings on different models and brands of galley carts. Further, a mounting portion of the guide has vertically elongated apertures so the height of the guide with respect to the floor can easily be adjusted by loosening fasteners (screws), sliding the guide up or down, and tightening the fasteners. The guides give airlines more flexibility in which galley carts to use on which aircraft and which new models or brands of galley carts to buy. The guides can also be used on wider aircraft to allow for smaller cart compartments to either have more cart compartments or space for other storage in the galley. The guides have a relatively thin profile to allow the spring portion of the guides to flex, not just to accommodate for different dimensions, but to stay in contact with the caster assemblies to prevent rattling. Shaping of the guides additionally provides easy access to all surfaces for cleaning.

Figure 1A:
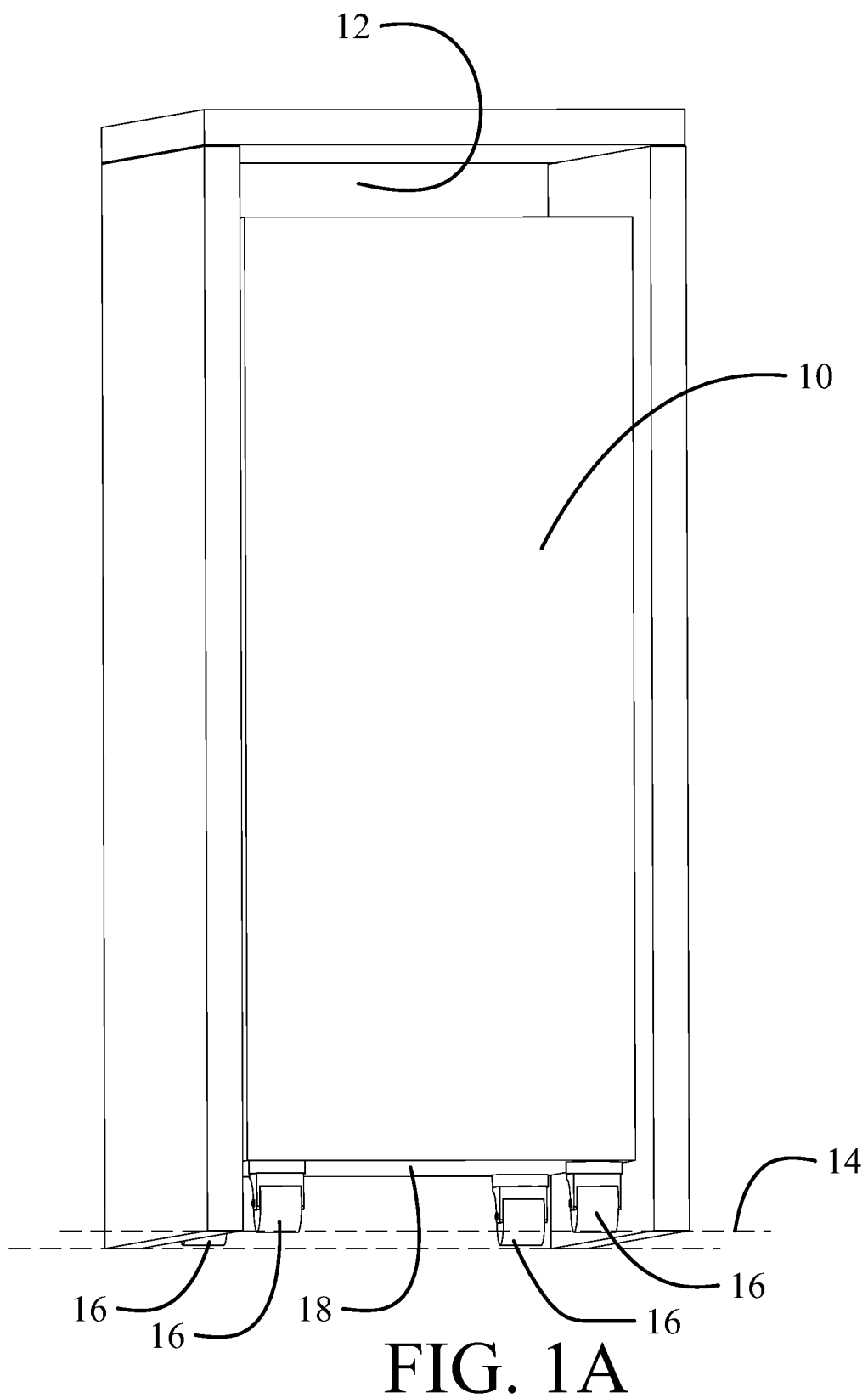
FIG. 1A is a pictorial representation of a galley cart storage compartment with galley cart inserted.
Figure 1B:
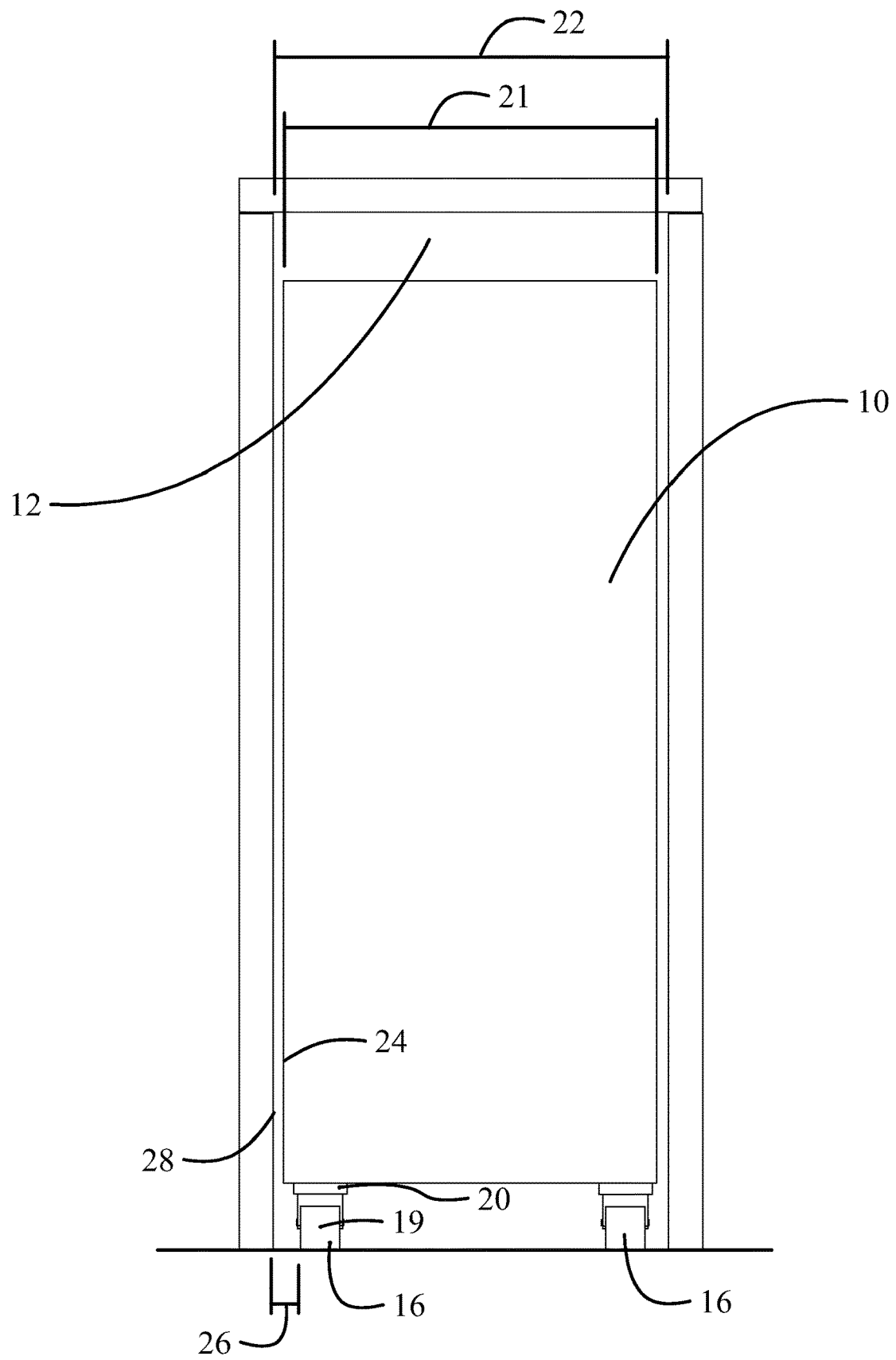
FIG. 1B is a front view of the galley cart storage compartment with galley cart inserted.

Referring to the drawings, FIGS. 1A and 1B show an exemplary galley cart 10 inserted into a cart storage compartment 12 (with a floor 14 represented by phantom lines in FIG. 1A). A single compartment is shown in the drawings but in many galleys multiple parallel compartments may be present. Cart 10 has four casters 16 mounted on a base 18 proximate the corners of the cart. In various configurations of carts, two, three, or four casters may be employed, with four casters located proximate the corners of the cart being the typical configuration. The casters themselves may have one wheel 19 with a swiveling mounting brace 20, as shown in the drawings, or two wheels or a spherical roller supported in the mounting brace in alternative configurations.

As seen in FIG. 1B, the cart 10 has an external width 21 less than an internal width 22 of the storage compartment 12. The difference in widths 21 and 22 accommodates entry of the cart 10 into the storage compartment 12 without undue difficulty. However, in a typical configuration with the casters 16 inset from walls 24 of the cart 10, a distance 26 between the casters in an aligned position and a wall 28 of the storage compartment 12 typically allows room for at least partial swiveling of the caster(s), if the casters are unconstrained, thereby creating a potential binding of the casters against the wall 28.

Figure 2A:
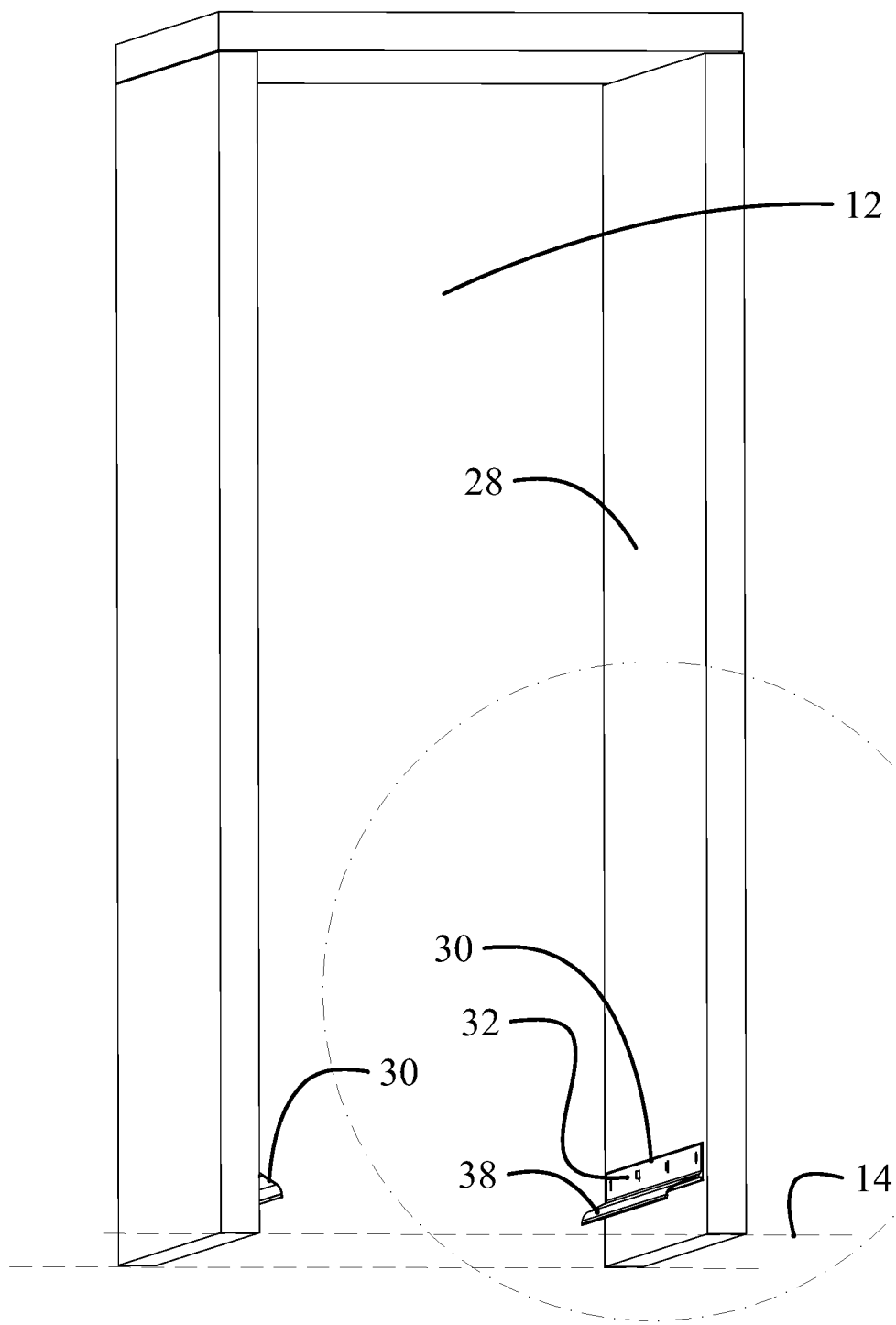
FIG. 2A is a pictorial representation of resilient caster guides mounted to the walls of the galley cart storage compartment.
Figure 2B:
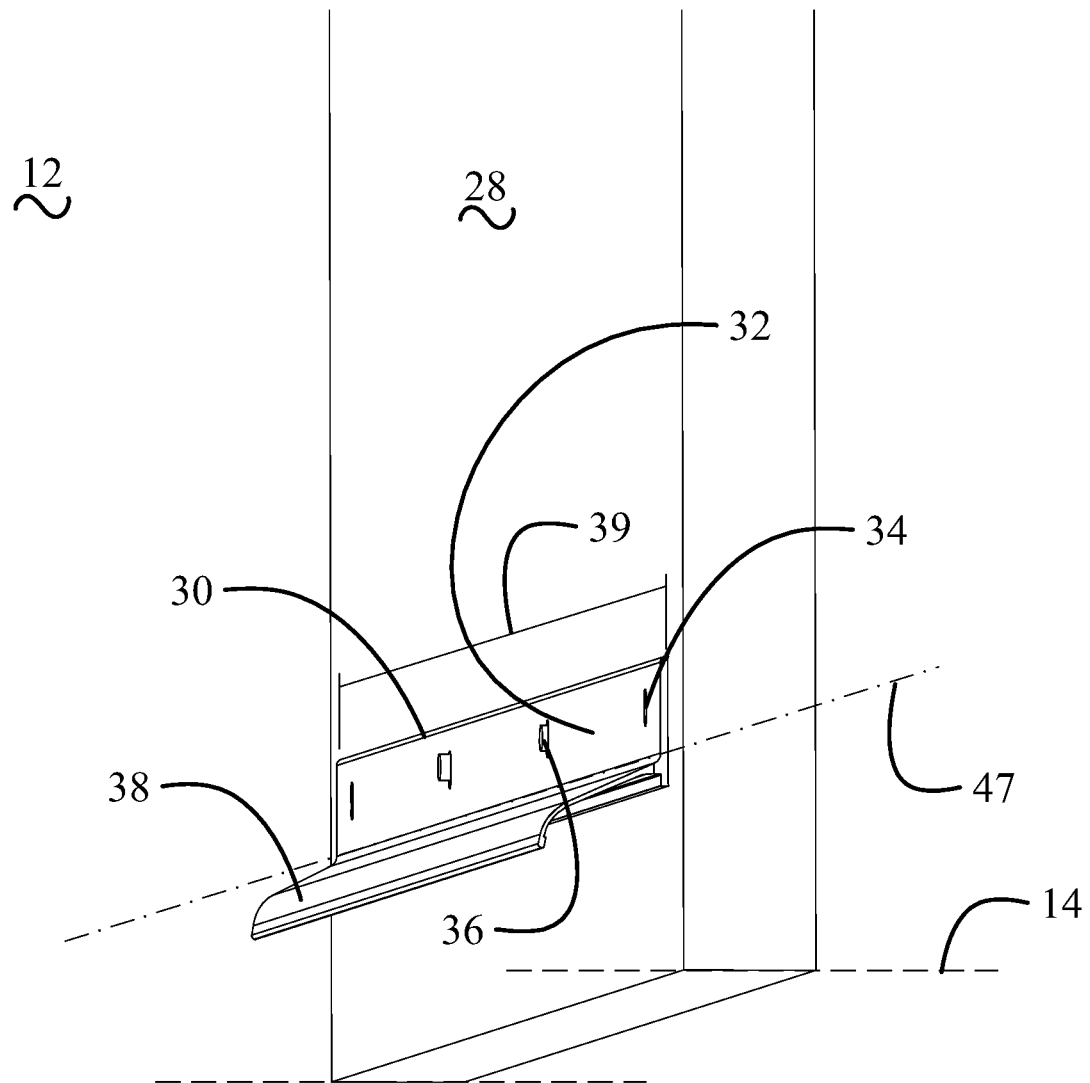
FIG. 2B is a detailed pictorial representation of the resilient caster guide as mounted on the galley cart storage compartment wall.
Figure 2C:
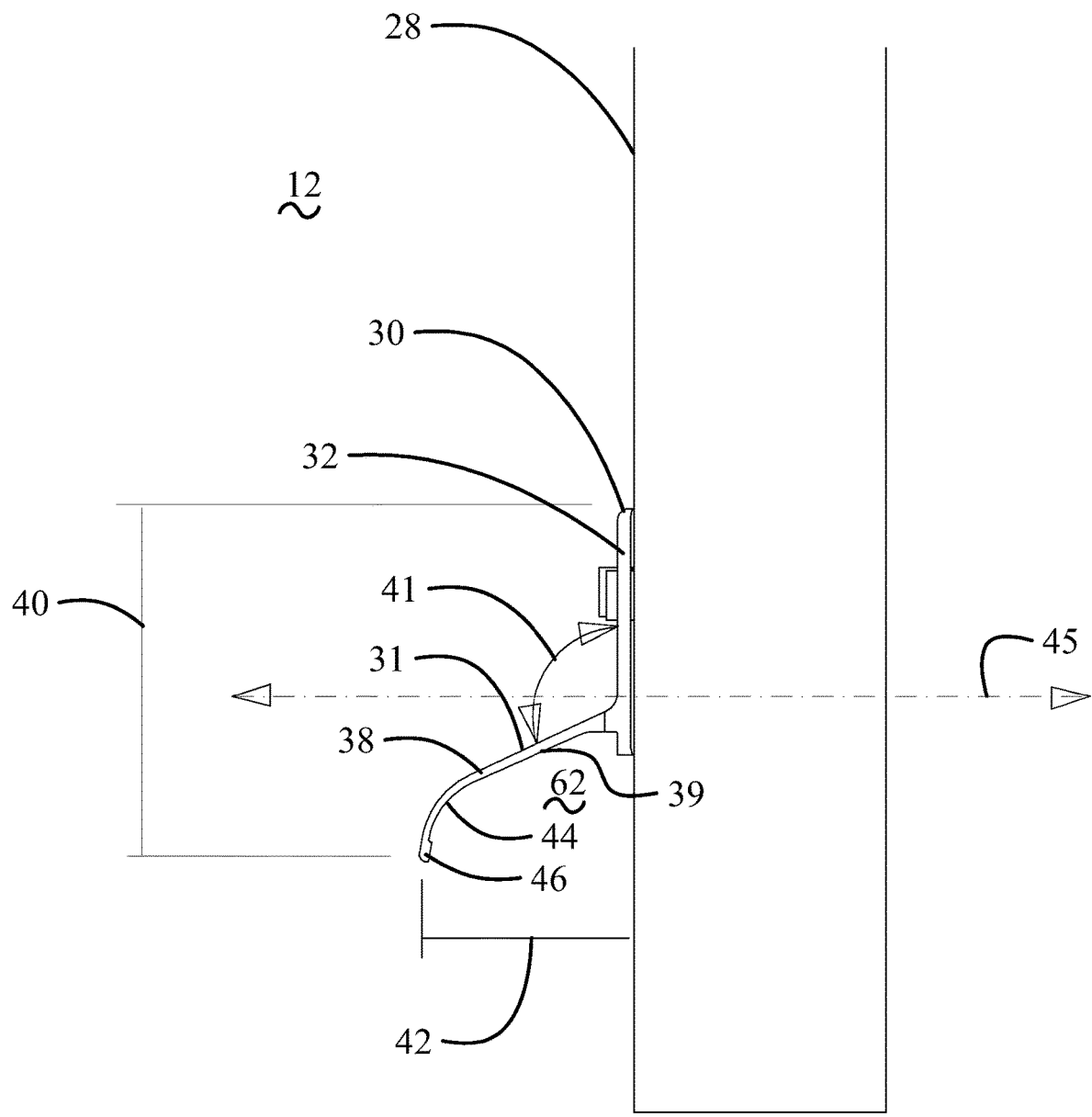
FIG. 2C is a detailed front view of the resilient caster guide as mounted on the galley cart storage compartment wall.

An exemplary embodiment of resilient caster guides 30 adapted for installation as a portion of a galley cart storage compartment 12 is shown in FIG. 2A. The caster guides 30 are mounted to walls 28 of the of the storage compartment 12 as seen in detail in FIGS. 2B-2C. Each caster guide 30 includes a mounting flange 32 configured to be received against the wall 28. A plurality of slotted apertures 34 is present in the flange 32 to receive fasteners 36, such as screws or rivets, to fix the flange 32 to the wall 28. The vertical orientation of the slotted apertures 34 allows leveling and height adjustment of the caster guide 30. A flexible alignment element 38 angularly extends from the mounting flange 32 into the storage compartment 12. For the exemplary embodiment shown in the drawings, the overall height 40 of the caster guide 30 is about 2.5 inches (6.35 cm) while the undeformed width 42 of the flexible alignment element 38 is about 1.5 inches (3.8 cm). While shown in the exemplary embodiment as extending continuously longitudinally and vertically, the mounting flange 32 may be a plurality of flange elements arranged along a length 43 of the caster guide 30 (as best seen in FIG. 2B). The length of the caster guide 30, in an exemplary embodiment, is about 34 inches (86.4 cm) but may be any desired length to allow the casters 16 to be engaged upon entry of the cart 10 into the storage compartment 12 and maintain engagement of the casters 16 through an insertion length of the cart 10 into the storage compartment 12.

The flexible alignment element 38 incorporates curved portion 44 terminating in a bead 46 distal from the mounting flange 32. The curved portion 44 enhances flexibility in a lateral direction (side to side represented by axis 45) of the flexible alignment element 38. In the exemplary embodiment, the curved portion 44 curves downward toward the floor 14 to urge downward flexing of the flexible alignment element 38 when contacted by a caster 16, as will be described in greater detail subsequently. For the exemplary embodiment, the flexible alignment element 38 has a relative angle 41 of greater than 90° with respect to the mounting flange 32 and/or the wall 28. The bead 46 enhances stability of the flexible alignment element 38 in a longitudinal direction (fore and aft represented by axis 47) to induce resilient recovery.

A cavity 62 is partially defined by the flexible alignment element 38, the curved portion 44, and the bead 46. When the guide 30 is coupled to the wall 28, the wall 28 further defines the cavity 62. An upper surface 31 of the guide 30 extends along the mounting flange 32, the flexible alignment element 38, and the curved portion 44 to the bead 46. A lower surface 39 of the guide 30 extends along the flexible alignment element 38, the curved portion, and the bead 46. The lower surface 39 partially surrounds the cavity 62.

Figure 3A:
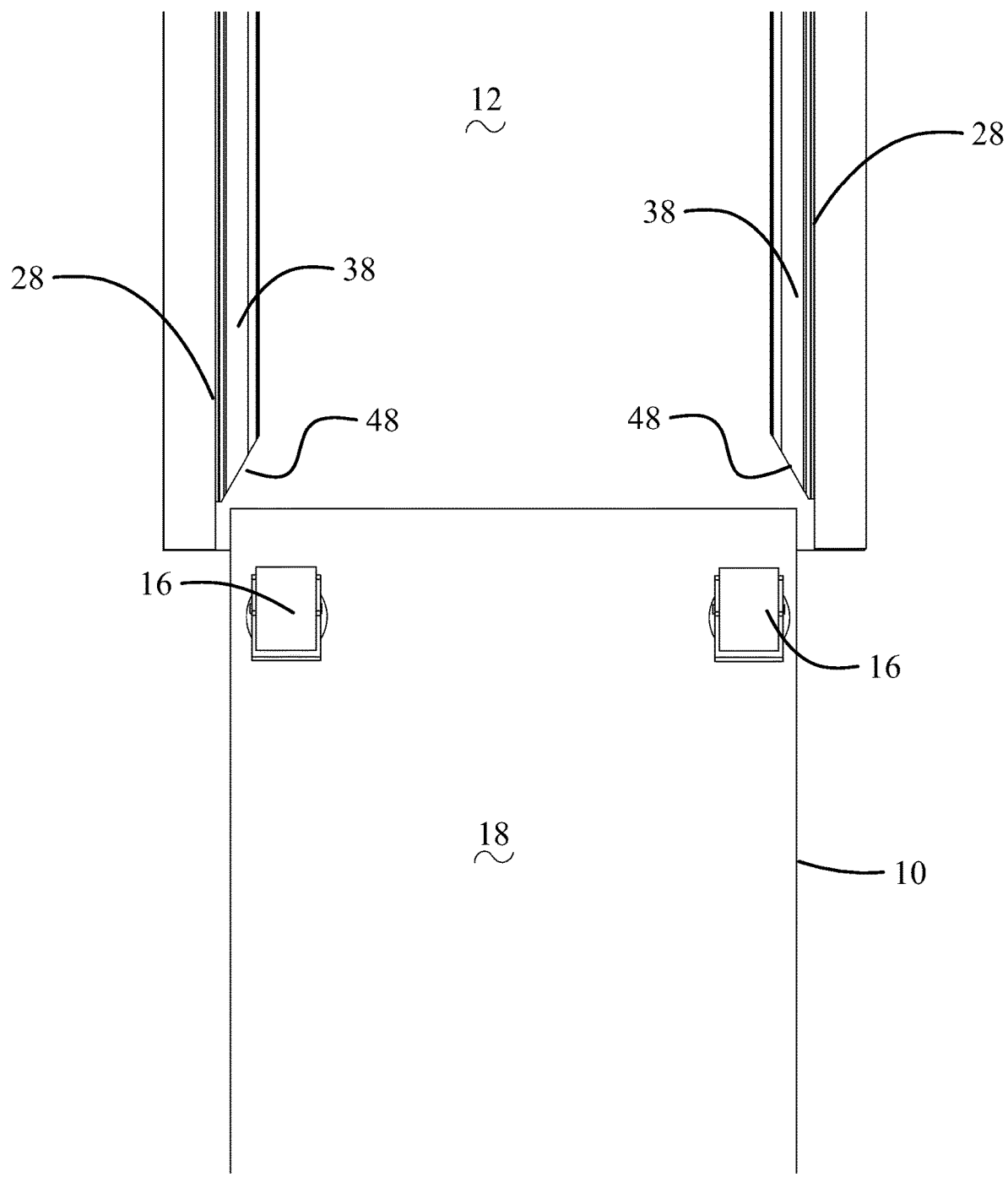
FIG. 3A is a bottom view of the galley cart being inserted into the galley cart storage compartment.
Figure 3B:
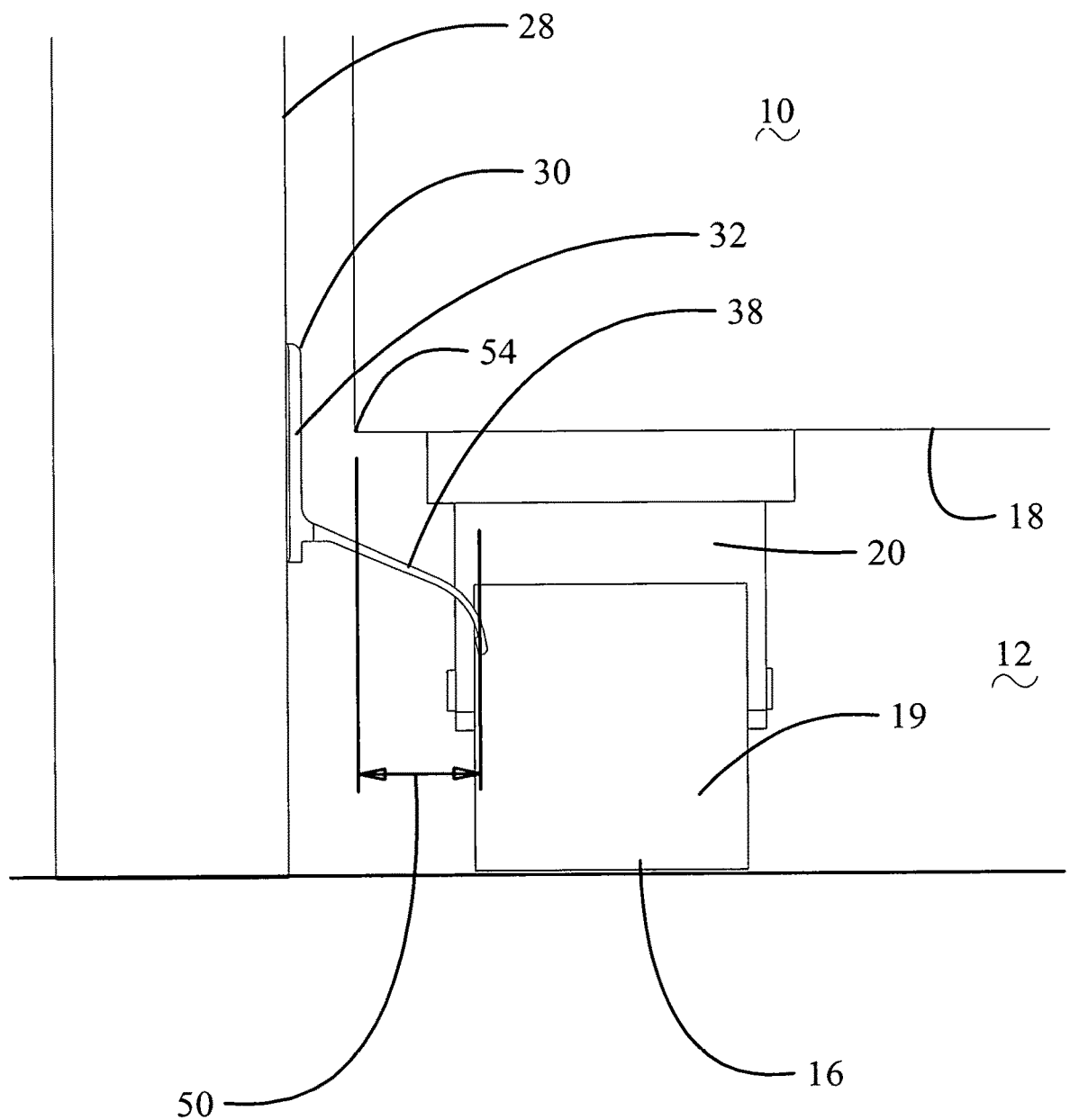
FIG. 3B is a detailed front view of the caster of the galley cart demonstrating the lateral flex range of the flexible alignment element of the resilient caster guide with the flexible alignment element flexed for a first caster configuration on the cart base.

As seen in FIG. 3A, with the galley cart 10 being inserted into the storage compartment 12, a leading edge 48 of each flexible alignment element 38 includes a chamfer to receive and direct the casters 16 during insertion. The flexible alignment element 38 has a lateral flex range 50 (as seen in FIG. 3B) that accommodates varying configurations of placement of the casters 16 on the base 18 of the cart 10. The flex range 50 is nominally 0.5 inch to 0.6 inch (1.3 cm to 1.6 cm). The resilience of the flexible alignment element 38 allows contact with the wheel 19 or mounting brace 20 to urge the flexible alignment element 38 downward to induce lateral displacement of the bead 46 outward toward the wall 28 of the storage compartment 12 while maintaining longitudinal alignment of the caster 16 with the compartment wall 28 (e.g., maintain the caster 16 or the wheel 19 substantially parallel to the wall 28).

Figure 3C:
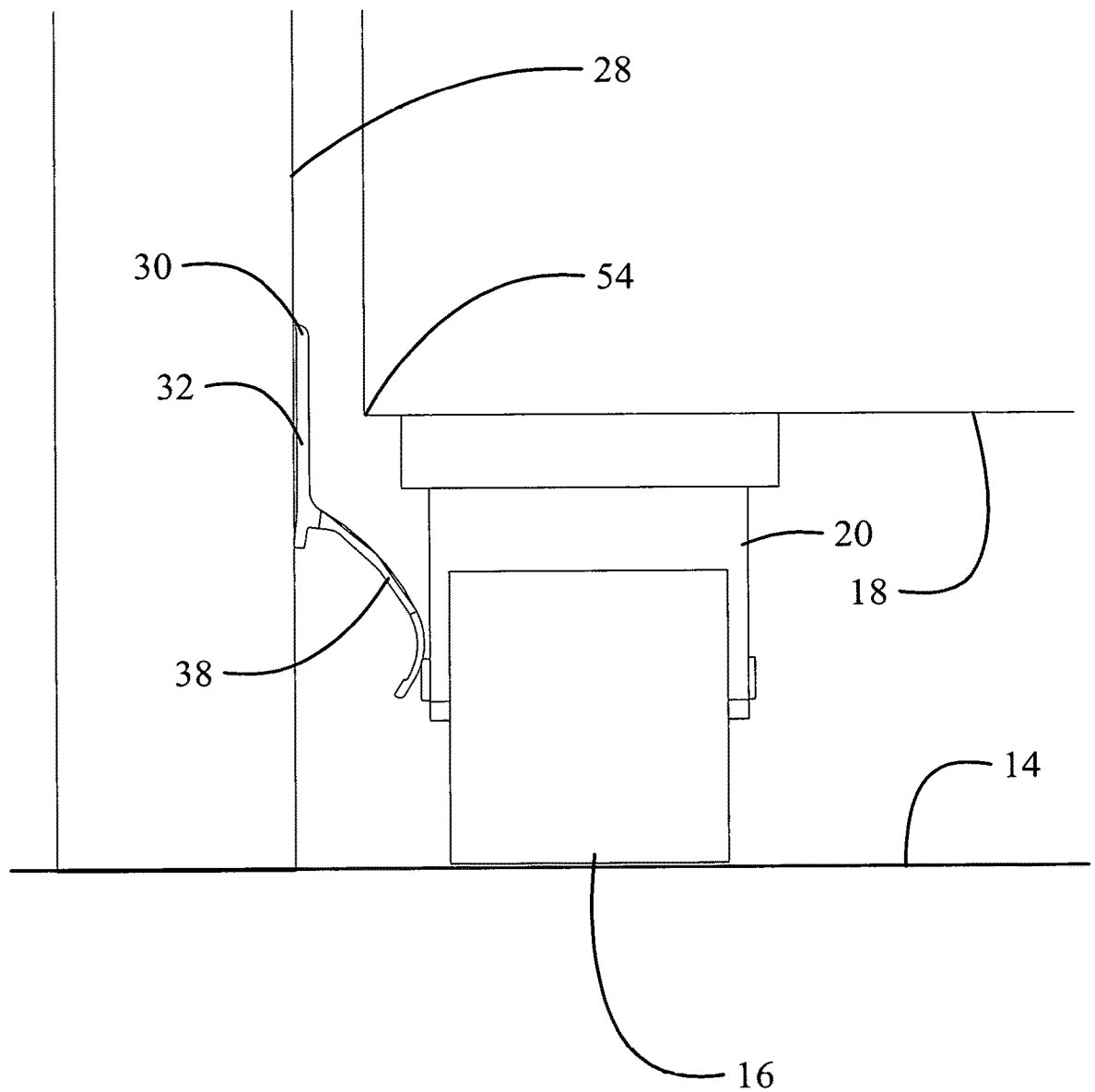
FIG. 3C is a detailed front view of the caster of the galley cart and the flexible alignment element flexed for a second caster configuration on the cart base.
Figure 4:
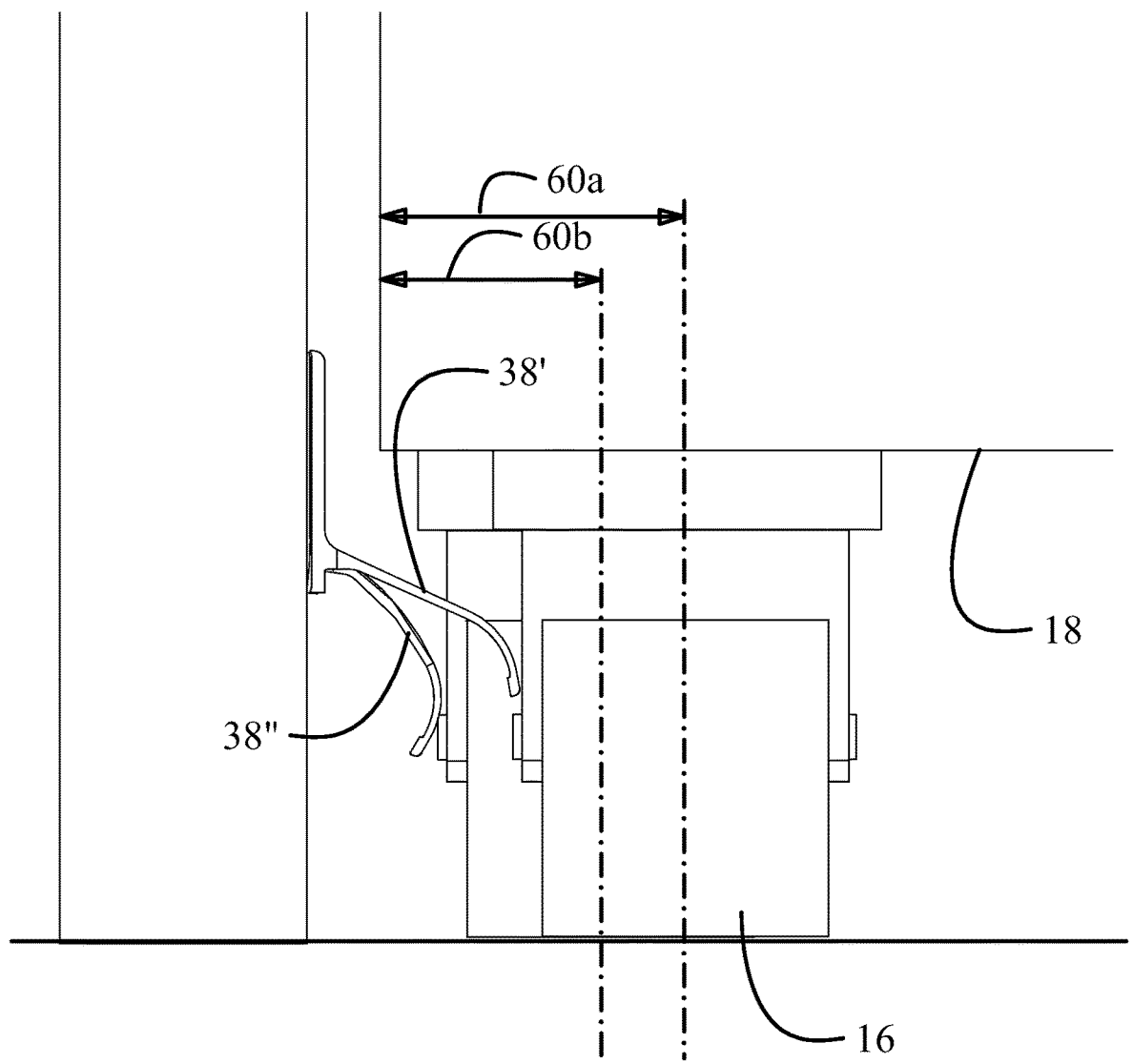
FIG. 4 is an overlay view of the casters and flexible alignment elements of FIGS. 3B and 3C; and, FIG. 5 is a flow chart of a method for caster alignment control using the embodiments disclosed.

FIGS. 3B and 3C show casters 16 mounted at varying insets from the lower corner 54 of the base 18 with the flexible alignment element 38 resiliently deflected to engage the mounting brace 20. FIG. 4 provides an overlay view of the caster positioning shown in FIGS. 3B and 3C demonstrating the varying inset distances 60a, 60b and the associated flexing of the flexible alignment element 38 to different flexed positions identified as 38' and 38"

approximating the flex range 50 as previously described. For example, the flexed position 38' corresponds to an inset distance 60a and may be near the lower end of the flex range 50, and the flexed position 38" corresponds to an inset distance 60b and may be near the higher end of the flex range 50.

The flexible alignment element 38 need not flex evenly along its entire length and may flex in longitudinally transitioning regions proximate the casters 16 as the cart 10 is inserted into the storage compartment 12. Accordingly, the flexible alignment element 38 is formed of polyocarbonate or polyamide plastic to allow the flexible alignment element 38 to flex without breaking. For an exemplary embodiment, a polycarbonate having a tensile strength of between 5.10 kilo-pounds per square inch (ksi) and 33.0 ksi (35.1 Mega-Pascal (MPa)-228 MPa), modulus of elasticity between 300 ksi and 3500 ksi (2070 MPa-24100 MPa), flexure strength between 3.60 ksi and 46.0 ksi (24.82 MPa-317.158 MPa, and flexural modulus between 112 ksi and 3100 ksi (772 MPa-21400 MPa) or a polyamide plastic having a tensile strength of at least 8.0 ksi, (55.16 MPa) a modulus of elasticity of at least 250 ksi (1720 MPa), flexural strength of at least 12.0 ksi (82.7 MPa) and flexural modulus of at least 300 ksi (2070 MPa) is employed. The plastic or polycarbonate material or similar compositions may be used to form the caster guide 30 by molding and/or machining the configuration of the mounting flange 32 and flexible alignment element 38.

The caster guides 30 adjust to the dimensions of caster mountings on different models and brands of galley carts 10 as described. The mounting flange 32 with vertically elongated apertures 34 allows height of the guide 30 with respect to the floor 14 to easily be adjusted by loosening fasteners 36 (screws), sliding the guide up or down, and tightening the fasteners 36. Additionally, the shape of the caster guide 30 and flexible alignment element 38, in particular, provide open access to both the upper surface 31 and the lower surface 39 surrounding a cavity 62 (seen in FIG. 2C) for inspection and cleaning to meet Federal Food and Drug Administration (FDA) guidelines.

Figure 5:
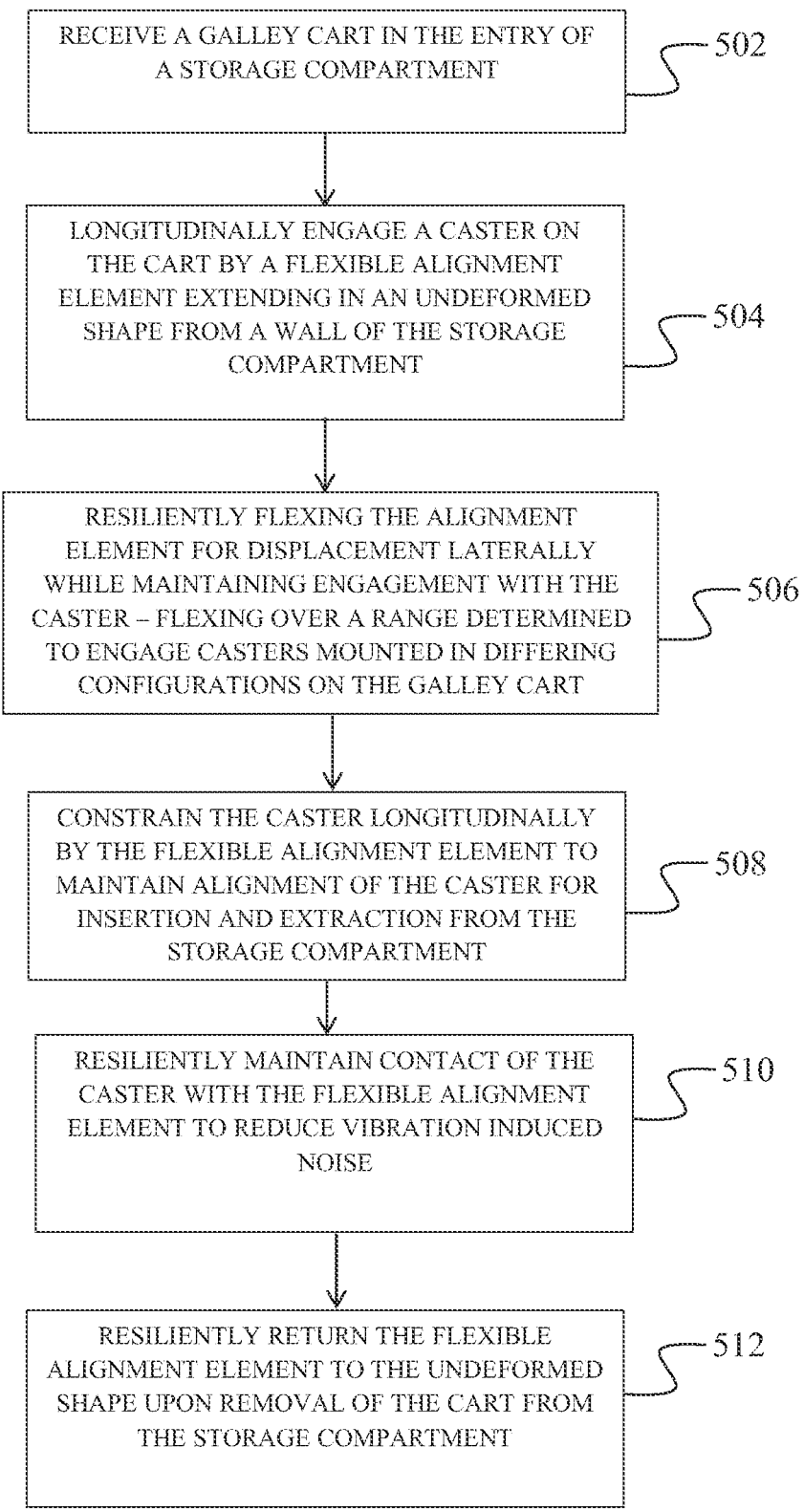

The embodiments disclosed herein provide a method 500 for caster alignment control as shown in FIG. 5. A galley cart 10 is received in the entry of a storage compartment 12, step 502. A caster 16 on the cart 10 is longitudinally engaged by a flexible alignment element 38 extending in an undeformed shape from a wall 28 of the storage compartment 12, step 504. The flexible alignment element 38 has a chamfered leading edge 48 for engagement of the caster 16. The flexible alignment element 38 resiliently flexes for displacement laterally but maintains engagement with the caster 16, step 506. Flexing of the flexible alignment elements 38 occurs through a flex range 50 determined to engage casters 16 mounted in differing configurations on the galley cart 10. In exemplary embodiments, the flexible alignment element 38 is curved and flexes downwardly to receive the caster 16. The caster 16 is constrained longitudinally by the flexible alignment element 38, step 508, to maintain alignment of the caster 16 with respect to the base 18 and/or the wall 28 for insertion and extraction of the cart 10 from the storage compartment 12. The flexible alignment element 38 resiliently maintains contact with the caster 16 when the cart 10 is present in the storage compartment 12 to reduce vibration induced noise during the taxi, take-off, turbulence, and landing, step 510. Upon removal of the cart 10 from the storage compartment 12, the flexible alignment element 38 resiliently returns to the undeformed shape, step 512.

Having now described various embodiments of the invention in detail as required by the patent statutes, those skilled in the art will recognize modifications and substitutions to the specific embodiments disclosed herein. Such modifications are within the scope and intent of the present invention as defined in the following claims.

What is claimed is:

1. A resilient caster guide comprising:
   a mounting flange configured to be received against a wall of a storage compartment for a galley cart; and
   a flexible alignment element angularly extending from the mounting flange into the storage compartment, said flexible alignment element incorporating a curved portion terminating in a bead distal from the mounting flange, said curved portion enhancing flexibility in a lateral direction and said bead enhancing stability of the flexible alignment element in a longitudinal direction to induce resilient recovery, said flexible alignment element configured to contact a caster extending from a base of the galley cart received in the storage compartment and to resiliently deform to maintain longitudinal alignment of the caster.

2. The resilient caster guide as defined in claim 1 wherein the curved portion curves downward toward a floor of the storage compartment to urge downward flexing of the flexible alignment element when contacted by the caster and inducing lateral displacement of the bead.

3. The resilient caster guide as defined in claim 1 wherein the flexible alignment element has an angle of greater than 90° with respect to the mounting flange.

4. The resilient caster guide as defined in claim 1 wherein the mounting flange incorporates a plurality of slotted apertures to receive fasteners therethrough to fix the flange to the wall of the galley cart storage compartment.

5. The resilient caster guide as defined in claim 4 wherein the slotted apertures are vertically oriented to allow leveling and height adjustment of the caster guide.

6. The resilient caster guide as defined in claim 1 wherein the flexible alignment element engages the caster upon entry of the galley cart into the storage compartment and maintains engagement of the caster through an insertion length of the galley cart into the storage compartment.

7. The resilient caster guide as defined in claim 1 wherein the flexible alignment element has a lateral flex range accommodating varying placement of the caster on the base of the cart.

8. The resilient caster guide as defined in claim 1 wherein the flexible alignment element is formed of plastic or polycarbonate.

9. A galley cart storage compartment comprising:
   walls extending from a floor, said walls spaced to accommodate insertion of a galley cart;
   a mounting flange configured to be received against an associated one of the walls; and,
   a flexible alignment element angularly extending from the mounting flange into the storage compartment, said flexible alignment element configured to contact a caster extending from a base of the galley cart received between the walls and to resiliently deform to maintain longitudinal alignment of the caster.

10. The galley cart storage compartment as defined in claim 9 wherein the flexible alignment element incorporates a curved portion terminating in a bead distal from the mounting flange, a lower surface of the curved portion partially defining a cavity and the associated one of the walls further defining the cavity providing open access for inspection and cleaning of the lower surface.

11. The galley cart storage compartment as defined in claim 9 wherein the flexible alignment element has a lateral flex range that accommodates varying configurations of placement of the caster on the base.

12. The galley cart storage compartment as defined in claim 9 wherein the flexible alignment element has a leading edge including a chamfer to receive and direct the caster during insertion.

13. The galley cart storage compartment as defined in claim 9 wherein the mounting flange incorporates a plurality of slotted apertures and the galley cart storage compartment further comprises fasteners received through the slotted apertures to fix the flange to the associated one of the walls.

14. A method for caster alignment control comprising:
providing a storage compartment having walls extending from a floor, said walls spaced to accommodate insertion of a galley cart;
providing a mounting flange configured to be received against an associated one of the walls; and,
providing a flexible alignment element angularly extending from the mounting flange into the storage compartment, said flexible alignment element configured to contact a caster extending from a base of the galley cart received between the walls and to resiliently deform to maintain longitudinal alignment of the caster;
receiving the galley cart in an entry of the storage compartment;
longitudinally engaging the caster on the cart with the flexible alignment element extending in an undeformed shape from one of the walls of the storage compartment;
resiliently flexing the flexible alignment element for displacement laterally but maintaining engagement with the caster; and
longitudinally constraining the caster with the flexible alignment element to maintain alignment of the caster for insertion and extraction of the cart from the storage compartment.

15. The method as defined in claim 14 wherein the step of longitudinally engaging includes engaging the caster with a chamfered edge.

16. The method as defined in claim 14 wherein the flexible alignment element is curved and wherein the step of resiliently flexing comprises flexing downwardly to receive the caster.

17. The method as defined in claim 14 further comprising:
maintaining contact with the caster with the flexible alignment element when the cart is present in the storage compartment; and
reducing vibration induced noise during taxi, take-off, turbulence, and landing.

18. The method as defined in claim 14 further comprising:
removing the cart from the storage compartment; and
resiliently returning the flexible alignment element to the undeformed shape.

19. The method as defined in claim 14 wherein the step of resiliently flexing includes flexing over a flex range to receive the caster with differing configuration on the galley cart.

20. The galley cart storage compartment as defined in claim 9 wherein the flexible alignment element has an angle of greater than 90° with respect to the mounting flange.

* * * * *